Patented Oct. 9, 1945

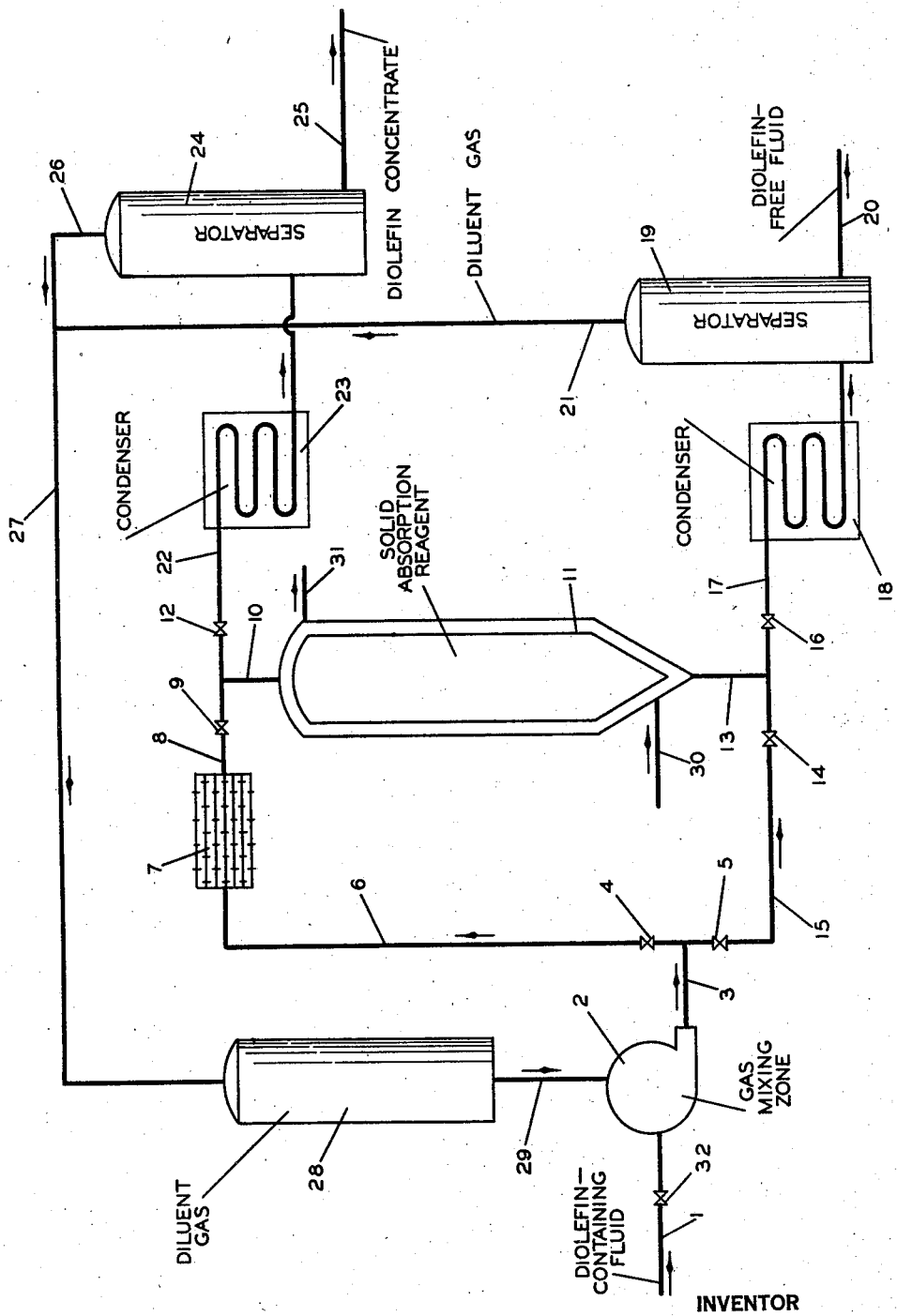

2,386,352

UNITED STATES PATENT OFFICE 2,386,352

PROCESS FOR THE TREATMENT OF HYDROCARBONS

Walter A. Schulze, Bartlesville, Okla., assignor to Phillips Petroleum Company, a corporation of Delaware Application January 29, 1942, Serial No. 428,774

2 Claims. (Cl. 260—681.5)

This invention relates to the purification of hydrocarbons. More particularly this invention relates to an improved method for segregating low-boiling aliphatic diolefins from complex hydrocarbon mixtures in which they occur. While presenting a process of broad application, this invention has particular reference to the separation and/or purification of conjugated diolefins of four, five, or more carbon atoms from hydrocarbon fluids of boiling points somewhat above the range of the so-called normally gaseous hydrocarbons.

Substances of the class of the diolefins and similar readily polymerizable compounds have assumed importance because of their use as starting materials in the manufacture of a variety of products of the nature of rubber and the like. As a result, diolefins produced as by-products in hydrocarbon pyrolysis or by various specific manufacturing processes have become increasingly valuable. This has in turn involved the development of satisfactory methods for selectively separating said diolefins from complex hydrocarbon mixtures and recovering concentrates of suitable purity for subsequent utilization.

A number of chemical separation methods have been proposed for diolefin purification in which various metal salt reagents, particularly those comprising salts of the monovalent heavy metals of groups I and II of the periodic system, have been employed to fix the diolefins in the form of insoluble complex salts and to effect a primary separation from hydrocarbon mixtures. Most widely used have been various modifications of cuprous halide reagents, especially cuprous chloride and bromide, which form hydrocarbon-insoluble addition complexes with butadiene hydrocarbons from which the diolefins may be recovered by heating to moderate temperatures. The efficiency of these processes has varied greatly, depending largely on the effectiveness of the contact between the reagent and the diolefin-containing hydrocarbon fluid, and the methods used for recovering the absorbed diolefin from the reagent. Certain solid-type reagents which comprise a base of granular material, mixed and/or impregnated with a cuprous halide or other suitable metal salt, have been found useful for separating diolefins from the paraffinic and/or olefinic components of hydrocarbon mixtures. Such solid-type reagents afford intimate contact with the diolefin-containing fluid; also the reagent is utilized efficiently in removing the diolefin from the hydrocarbon stream as the addition complex, which is retained on the reagent surface. Thus, the solid reagents are efficient by nature, but the conditions under which the hydrocarbons are passed over such reagents have a significant influence on the purity of the recovered diolefin, and also upon the useful life of the reagent itself.

Since the formation of the diolefin-cuprous halide complex upon which the above-mentioned separation methods depend is favored by low temperatures and relatively long contact time, conditions of temperature and pressure have often been employed which may maintain normally gaseous hydrocarbon mixtures in liquid phase. While good results are obtained with easily vaporizable mixtures, such as $C_4$ hydrocarbon fractions, certain less desirable effects appear in the treatment of higher-boiling mixtures containing hydrocarbons of five or more carbon atoms.

These heavier hydrocarbons have an appreciable solvent action on the cuprous halide, and liquid phase operation results not only in small but steady losses of reagent by solution in the liquid effluents but also in the necessity of treating said effluents to remove the dissolved metal salts. Further, the non-diolefinic hydrocarbons of lower volatility are retained on the reagent to a certain extent and are more difficult to remove, e. g., by vaporization, without causing concurrent losses of the diolefins by premature decomposition of the diolefin-cuprous halide addition compounds. Of course, if the non-diolefinc hydrocarbons are allowed to remain on the reagent during desorption of the diolefins, an impure product is obtained.

It is an object of this invention to provide a process for the separation of hydrocarbon mixtures. Another object is to provide means for minimizing retention of non-diolefinic hydrocarbons by metal salt reagents and/or metal salt-diolefin complexes. A further object of this invention is to provide a method for maintaining normally liquid hydrocarbon mixtures in vapor phase during contact with cuprous halide reagents at temperatures and pressures ordinarily regarded as causing condensation of hydrocarbons from said mixtures. Yet another object is to provide a method for separating low-boiling conjugated diolefins from other hydrocarbons in an improved degree of purity. Other objects and advantages will become apparent from the more detailed description which follows.

I have found that by dilution with a substantially non-condensible gas, a diolefin-containing hydrocarbon mixture which tends to liquefy at conditions employed in diolefin separation by cuprous halide reagents may be maintained in vapor phase, with consequent improvement in the reagent life and in the purity of the subsequently recovered diolefin. The diluent gas is mixed with the diolefin-containing fluid, according to my process, so as to produce a vapor mixture in which the partial pressures of the liquefiable components are reduced sufficiently to result in a gaseous mixture having a dew point substantially below the treating temperatures at the pressures employed.

In one specific application, my process comprises the steps of (1) mixing a suitably inert substantially non-condensible gas with a diolefin-containing hydrocarbon liquid to produce a vapor mixture of the desired low dew point, (2) passing the vapor mixture in contact with a solid-type cuprous halide reagent to effect separation of the diolefin as the cuprous halide addition compound, and (3) heating the reagent bearing said addition compound, after removal of unreacted vapors, to desorb and recover the diolefin.

The accompanying figure illustrates one specific form of apparatus for the application of this new process. In the first, or absorption cycle, the hydrocarbon fluid to be processed enters the system through line 1 and valve 32, passing to the gas mixing zone 2, in which the hydrocarbon fluid encounters the diluent gas entering by line 29. The diluted vapor passes by line 3 to line 6 controlled by valve 4, thence through cooler 7 and on to the reagent zone 11 via line 8, valve 9, and line 10. Throughout this absorption cycle, the valves 5, 12 and 14 are closed. The vapor passes through the zone 11 containing a suitable metal-salt reagent, then moves via line 13, valve 16, line 17 and condenser 18 to separating zone 19, wherein the diluent gas is taken overhead and the substantially diolefin-free hydrocarbon liquid is removed as bottoms through line 20. The diluent gas passes by line 21 and line 27 to storage zone or gas holder 28, whence it may be recycled through line 29. When the metal salt in zone 11 is substantially completely converted into diolefin complex, or when absorption of diolefin decreases to an unsatisfactory level, the absorption cycle is completed, and valve 32 is closed, thus discontinuing the flow of the hydrocarbon fluid. The diluent gas is then passed alone over the reagent in zone 11, and then on through the separating zone 19 to remove small amounts of hydrocarbons swept out of the reagent. At the end of the sweeping-out operation, valves 4, 9 and 16 are closed and valves 5, 14 and 12 are opened. By this means, the gas is directed from storage zone 28 by line 3, through valve 5, line 15, valve 14 and line 13 to reagent zone 11 to help in removing diolefins from the reagent. At the same time, a heating medium is applied to the outer jacket of the zone 11, entering by line 30 and leaving by line 31. The gas-diolefin mixture passes by line 10, valve 12, line 22 and condenser 23 to separating zone 24, wherein liquid diolefin is separated from the gas. The diolefin liquid passes by line 25 to storage while the gas is transferred to storage zone 28 by lines 26 and 27. At the completion of the desorption operation, the reagent may be cooled and used again to absorb additional amounts of diolefins in accordance with the first step described above. If desired a cooling medium may be passed through the jacket of zone 11 during the absorption cycle.

In view of the foregoing description, it will be obvious that two or more reagent zones 11 may be used, with their supply and product lines and valves, in order to make a system operating continuously. It will therefore be understood that the process may be operated batchwise, with one reagent zone, or continuously with two or more of said zones, depending upon the requirements of the individual installation.

The diluent and/or flushing gas, as used in this process, is generally of low molecular weight and high volatility, ordinarily being a substance which is above its critical temperature under operating conditions, although this is not essential. Moreover, the gas is substantially oxygen-free, and inert toward either the hydrocarbon mixture or the reagent, and has substantially no solubility in the reagent. Suitable non-condensible gases, for example, are methane, hydrogen, nitrogen, and natural gas substantially free of reactive impurities and hydrocarbons heavier than propane. Other gases having properties according to the aforesaid requirements may also be used within this invention.

The separation of such gases from the much less volatile hydrocarbons under treatment at any desired point in the process is easily accomplished since the disparity in the boiling points is so great. Thus the presence of the diluent gas in the desorbed diolefin vapor or liquid is not detrimental since the composition of this mixture permits ready recovery of the desired components.

The diolefin-containing fluids to be treated by this process are preferably closely fractionated hydrocarbon mixtures of reasonably constant composition which may comprise $C_5$ hydrocarbons, although the process is obviously applicable to lighter and/or heavier fractions within the limits disclosed. In fact, similar condensation difficulties have been encountered in treating butadiene-containing hydrocarbon mixtures and have been readily overcome by the practice of this invention. The usefulness of this invention in treating $C_6$ and heavier mixtures is obvious. Thus, any mixture which is to be treated in vapor phase and which contains sufficient higher boiling components to cause condensation within the reagent vessels may be diluted with non-condensible gas to lower the condensation temperature or dew point to a value substantially below the temperature employed in the diolefin absorption. Since there is usually a margin of safety between the operating temperature and the dew point of the diluted vapor mixture, minor composition changes are not harmful, but major changes require recalculation of the proportions of the vapor mixture.

The process may be operated at low pressures in the range of zero to 80 pounds per square inch, with operation between 10 and 40 pounds per square inch ordinarily being preferred. Pressures outside these ranges may be used in the absorption step, but no particular purpose is served thereby, and excessively high pressures in particular may be distinctly disadvantageous in that greater dilution of the diolefin-containing fluid is entailed. Subatmospheric pressures are sometimes used in the desorption operation since the decomposition of the complex may be assisted thereby.

Temperatures ranging from about 0 to about 80° F. may be used in the absorption step, when a cuprous chloride reagent is utilized, and it is ordinarily preferred to conduct operations in the range of about 30 to 60° F. At these temperatures the diolefin complex is readily formed and satisfactorily stable. Lower temperatures require greater dilution of the liquefiable charge, and higher temperatures may induce decomposition of the complex, so that conditions of temperature outside those given are not commonly employed for the formation of cuprous halide complexes.

The proportions of non-condensible diluent gas to be added to any hydrocarbon fluid for the purposes of this process may be determined experimentally or calculated approximately from the vapor pressure and composition of the fluid to be vaporized. With closely fractionated cuts the vapor pressure of the whole mixture may be considered, or the predominant component may serve as the basis for calculation. From the vapor pressure of the said predominant component at the operating temperature, a limiting maximum value for the partial pressure of the condensible fluid in the total vapor mixture is obtained, and sufficient non-condensible gas is added to produce mol fractions and partial pressures substantially below said limiting value. In general, vapor mixtures with dew points from 5 to 25° F. below the diolefin absorption temperature are preferred although still greater differences may be employed if desired.

The absolute concentrations of diolefins in the vapor mixtures prepared for treating according to my invention will vary with the concentration of diolefins in the hydrocarbon fluids diluted and with the amount of diluent added. In general, the diolefin concentration in vapor mixtures passed over the reagent may range from less than one to 20 per cent or higher, and suitable control of the contact time is maintained to give the desired completeness of diolefin removal. Flow rates of the vapor mixtures may range from 10 to 600 gas volumes per hour per volume of reagent with a narrower range of about 50 to 350 volumes per hour being generally satisfactory for the diolefin concentrations usually encountered.

An additional important feature of my process is the step of passing the diluent gas alone through the reagent chamber to remove traces of unreacted hydrocarbons adsorbed on the reagent. This assists in reducing contamination of the desorbed diolefin concentrate by non-diolefinic hydrocarbons mechanically retained by the reagent.

The following exemplary operations by the process of this invention will serve to clarify the methods used as well as to present sample data and calculations:

Example I

A crude isoprene mixture to be processed had the following composition:

| | Volume per cent |
|---|---|
| Pentene-1 | 5 |
| 2-methylbutene-1 | 13 |
| Isoprene | 50 |
| n-Pentane | 27 |
| Pentene-2 | 5 |

Three gas volumes of methane were added to each gas volume of the above mixture, and the diluted mixture having a dew point of about 30° F. at 15 pounds gage was cooled to 40° F. at a pressure of 15 pounds gage. This mixture was passed at the rate of about 150 volumes per reagent volume per hour over a reagent comprising cuprous chloride on asbestos until absorption became very slow. The flow of diolefin-containing mixture was then discontinued and the methane alone was passed for 10 minutes at 40 to 50° F. before the heating medium was applied to the reagent zone. The reagent bed was then heated to 200° F. with methane still passing and the evolved vapors were cooled and partially condensed. After separation of the methane, the product was found to be 96 per cent isoprene.

Another portion of this C₅ mixture was treated in liquid phase without gas dilution under the same conditions as above, using a flow rate of about one liquid volume per hour. The desorbed product contained only 65 per cent isoprene.

Example II

A mixture containing piperylene had the following pomposition:

| | Volume per cent |
|---|---|
| n-Pentane | 30 |
| Pentene-2 | 20 |
| Trimethylethylene | 15 |
| Piperylene | 35 |

The mixture was diluted with nitrogen in the ratio of four parts to one to produce a vapor mixture with a dew point of 15° F. at treating pressure. The vapor mixture was cooled to 50° F. and contacted with solid cuprous chloride reagent at a pressure of 10 pounds gage and a rate of 300 gas volumes per hour. At the conclusion of the absorption cycle the nitrogen was passed alone to flush out the reagent zone. The nitrogen flow was then passed into the reagent zone without precooling while the diolefin was desorbed at a temperature of 175° F. The nitrogen was separated from the condensed piperylene concentrate, which contained 95 per cent piperylene.

Example III

A hydrocarbon stock having the composition

| | Volume per cent |
|---|---|
| Pentene-1 | 5 |
| 2-methylbutene-1 | 15 |
| Isoprene | 75 |
| n-Pentane | 5 | was blended with five volumes of hydrogen per gas volume of charge stock, cooled to 60° F., and passed at a pressure of 25 pounds gage, over a solid cuprous chloride reagent to separate the isoprene. Substantially no condensation occurred since the dew point of the vapor mixture was about 43° F. The reagent was flushed with hydrogen after absorption had substantially ceased. Following the flushing step, the reagent bed was heated while a stream of uncooled hydrogen passed through the bed, carrying out the desorbed substance. At the conclusion of the desorption, the analysis of the product freed from hydrogen indicated substantially pure isoprene.

I have thus discovered undesirable effects which accompany liquid-phase operation or partial condensation during vapor phase operation, which effects cannot be eliminated merely by raising the temperature of operation, since that temperature is limited by the stability of metal salt-diolefin complexes, and I have furthermore supplied a method which overcomes the difficulties involved in a wholly satisfactory manner.

The foregoing description has been particularly directed toward the purification of mixtures comprising hydrocarbons containing five carbon atoms. As will be perceived by those skilled in the art, however, other hydrocarbons may be treated by this process merely by modification of details of operation. Furthermore, although certain solid-type cuprous halide reagents have been referred to especially in the examples, my invention may be successfully applied to other metal-salt-type reagents which form complexes with hydrocarbons. The terms of the examples and descriptions hereinbefore set out are not, therefore, to be construed as limitations.

The terms "inert" and "non-condensible" as used with reference to the diluent gas mean substantially inert toward the reagent and the hydrocarbons undergoing treatment, and non-condensible under the conditions of operation.

I claim:

1. A process for the purification of low-boiling normally liquid diolefins which comprises introducing hydrocarbons containing same into a stream of an inert non-condensible gas in such proportion as to give a mixture having a dew point at least 5° F. below treating temperature, treating said mixture by contact with a solid cuprous halide reagent to retain said diolefins on the reagent as a cuprous halide-diolefin complex, separating said gas from unreacted hydrocarbons and recycling said gas, flushing the reagent containing said complex with said inert non-condensible gas to remove unreacted hydrocarbons, and heating said reagent to decompose said complex and recover purified diolefins.

2. A process which comprises continuously passing an inert non-condensible gas through a reagent zone containing a solid metal salt reagent capable of selectively retaining hydrocarbons by formation of a thermally unstable hydrocarbon-metal salt complex, and segregating hydrocarbons from a hydrocarbon mixture through formation of said complex by (1) introducing said hydrocarbon mixture into said gas in such proportions as to give a vapor mixture having a dew-point substantially below the temperature maintained in said reagent zone during an absorption cycle to selectively absorb hydrocarbons in said zone through metal salt complex formation, (2) stopping the introduction of said hydrocarbon mixture to allow the flushing of unreacted hydrocarbons from said reagent zone by said gas, (3) heating said reagent zone to decompose said complex while flushing said zone with said gas whereby selectively absorbed hydrocarbons are removed in admixture with said gas, and (4) recovering hydrocarbons from said gas.

WALTER A. SCHULZE.